United States Patent [19]

Nishibori

[11] Patent Number: 4,505,869

[45] Date of Patent: Mar. 19, 1985

[54] METHOD FOR MANUFACTURING WOOD-LIKE MOLDED PRODUCT

[76] Inventor: Sadao Nishibori, 1-9, 1-Chome, Higashishinagawa, Shinagawa-Ku, Tokyo, Japan

[21] Appl. No.: 468,650

[22] Filed: Feb. 22, 1983

[30] Foreign Application Priority Data

| Mar. 3, 1982 [JP] | Japan | 57-33436 |
| Apr. 30, 1982 [JP] | Japan | 57-72669 |
| Apr. 30, 1982 [JP] | Japan | 57-72671 |

[51] Int. Cl.$^3$ .............................................. B01J 2/20
[52] U.S. Cl. ...................................... 264/115; 264/118; 264/211
[58] Field of Search ............... 264/115, 122, 118, 211, 264/349; 523/205, 208; 524/13, 14, 452; 527/312

[56] References Cited

U.S. PATENT DOCUMENTS

| 2,033,411 | 3/1936 | Carson | 264/115 |
| 3,736,221 | 5/1973 | Evers et al. | 264/115 |
| 3,995,003 | 11/1976 | Potter et al. | 264/122 |
| 4,003,866 | 1/1977 | Paturle | 524/452 |
| 4,228,116 | 10/1980 | Colombo et al. | 264/211 |
| 4,267,285 | 4/1981 | Broutman | 264/349 |
| 4,282,120 | 8/1981 | Listerni | 264/349 |
| 4,376,852 | 3/1983 | Lindentors | 527/312 |

FOREIGN PATENT DOCUMENTS

| 511346 | 1/1976 | Japan | 523/205 |
| 57-25957 | 2/1982 | Japan . | |
| 57-96851 | 3/1982 | Japan . | |
| 1067940 | 5/1967 | United Kingdom | 523/205 |
| 1416840 | 12/1975 | United Kingdom . | |
| 1600469 | 10/1981 | United Kingdom . | |

OTHER PUBLICATIONS

Riegel's Handbook of Industrial Chemistry, Title Page and pp. 177–178, 8th Edition.

*Primary Examiner*—Jay H. Woo
*Assistant Examiner*—Jill Fortenberry
*Attorney, Agent, or Firm*—Holman & Stern

[57] ABSTRACT

The present invention relates to a method for manufacturing wood-like molded products comprising the steps of preparing a fine powder of wood material solidified by a thermosetting resin and mixing the same with a resin. More particularly, it relates to a method for manufacturing a molded product having improved quality, and especially the advantages of both wood and plastic by eliminating water and wood vinegar contained in the wood chip aggregate to be mixed and by imparting a surface smoothness.

12 Claims, No Drawings

METHOD FOR MANUFACTURING WOOD-LIKE MOLDED PRODUCT

DETAILED DESCRIPTION OF THE INVENTION

The present invention aims to provide a synthetic molded product having the combined qualities of wood and resin, by mixing wood chips of relatively fine particles used as a molding aggregate with a synthetic resinous material such as vinyl chloride and the like and subjecting the resultant mixture to extrusion or injection molding.

One of the principal objects expected in the present invention is to improve the molding characteristics by the use of a special wood meal aggregate thereby preventing various disadvantages such as wear of the extrusion or injection cylinder, damage of the die and the like at the time of molding as well as roughened surface of the molded product. Further, it aims to provide a synthetic molded product having no cavity formed around the aggregate surface by improving the affinity of the aggregate with the resinous material.

Another object of the present invention is to improve the wood meal aggregate so that a relatively large amount of aggregate can be mixed without difficulty in terms of moldability as well as affinity with the resinous material to be molded. This leads to manufacture of a synthetic molded product exhibiting a smaller distortion of cooling contraction and an elasticity coefficient three-fold greater than that of a conventional molded product of vinyl chloride, having no strain, warping, cracking, etc., and having sufficient surface hardness.

Still another object of the present invention is to improve the material having various characteristics intrinsic to wood so that it can be easily subjected to mass-production by means of extrusion or injection molding into arbitrary shapes.

Still another object of the present invention is to provide a synthetic molded product which, because of the characteristics of the raw materials, has excellent resistance against wear and yet is free from pulling due to shrinkage in molding. The molded product according to the present invention will further be provided with surface characteristics identical with those of wood in actual use, namely color, touch, finish coating, adhesion, laminating, etc.

The method for molding the synthetic product according to the present invention attains the above mentioned objects.

The examples to be described hereunder as well as other obvious corresponding means are expected to be used. They will become apparent in the following description.

A typical method for molding the synthetic molded product according to the present invention for use as a building or fitting material will now be described in detail.

The raw materials to be used include a thermoplastic resin, such as vinyl chloride, ABS resin polystyrene, etc., aggregate with wood chips as the main ingredient, powder of calcium carbonate, a stabilizer and a colorant.

The thermoplastic resin is to be selected and used according to various requirements for the final molded product. Vinyl chloride resins are particularly preferred when strength and hardness are desired in the final product for use as a building and fitting material.

The aggregate to be used comprises fine wood chips of 100 mesh or more, or ideally 150 mesh or more, as the base, and can be manufactured by one of the following two methods.

One method comprises the steps of adding urea resin as the binding agent to wood chips or wood meal of relatively coarse particles, subjecting the mixture to hot pressing into a plate, rod or lump at a temperature ranging from 100° to 170° C. and then forming the thus heated and solidified substance into aggregate having a particle diameter of 120 mesh or more by any arbitrary method.

It is noted that although pulverization, cutting and the like are possible methods for reforming the once heated and hardened substance into an aggregate of fine particles, grinding with the use of sandpaper is preferable in view of the relatively uniform particle diameter of the resultant powder. A combination of different sandpapers will produce aggregate having better quality and workability from the standpoint of the amount of molding per unit hour (molding efficiency) and uniformity of the particle diameter of the resultant powder (molding quality). For example, 92% of the solidified substance is first ground with No. 40 sandpaper and the remaining 8% by No. 120 sandpaper. The fine pulverization is redried, the crude pulverization is repulverized and redried and these are provided as fine dry particles.

The second method for preparing the aggregate comprises the steps of pulverizing or grinding the wood material itself to obtain fine powder of 100 mesh or more (ideally 150 mesh or more), causing a urea resin to adhere to the said powder, and then thermally setting the mixture by hot air at a temperature between 100° and 170° C. to obtain hardened aggregate of fine particles of 100 mesh or more.

The water content of the aggregate thus obtained is reduced to less than 13% at the maximum, ideally in the range of between 3 and 5%, and still more preferably as close as possible to 0% by heating during the processing. This way, possible formation of steam can be checked during the subsequent process of molding a resin mixed with the aggregate. Dissociation and volatilization of the wood vinegar content can be prevented to eliminate the possibility of acidic gas formation.

It is noted that the aggregate to be used is subjected to heating and drying not only during its pulverization process but also during other stages in order to achieve the degree of drying required for each state of the aggregate material, namely the wood chips or woodmeal before molding into aggregate, the solidified substance during the molding process, or the final aggregate pulverized and molded. It is also noted that because of their highly hygroscopic nature, it is necessary to give an extra seal or post-treatment to the wood chips or meal after drying.

Thus, the wood vinegar, especially acetic acid gas contained in the wood chips, is vaporized and neutralized during the processes of adding the thermosetting resinous adhesive and heating and molding. Therefore the aggregate thus obtained is effectively limited in the possibility of acidic gas formation therefrom during the subsequent process of mixing the same with the resinous material for molding.

Since the water contained in the aggregate is substantially vaporized by heating and drying carried out for molding of the aggregate, there will be formed neither steam, which is detrimental in the molding of resins with the use of aggregate, nor foams, cavities, rough surfaces, etc. in the final product. Removal of water contained in the wood chips also plays an important role in volatilization of the wood vinegar in the wood chips. Dissociation and volatilization can not be effectively prevented until the wood vinegar contained in the wood meal is reacted with water. Therefore, elimination of the wood vinegar is made more effective by preventing formation of wood vinegar gas from the aggregate itself as well as eliminating the same during said process of heating-binding-hardening with the use of thermosetting resin.

That the wood vinegar formation is prevented in the aggregate has a great significance in the subsequent molding of the resin. If wood vinegar gas is formed during molding, the cylinder screws, molding die or metal mold of the extruder injecter used for molding would be oxidized and erroded at the inner wall thereof, whereby durability as well as efficiency of the molding will be greatly reduced. Particularly problematic are molding defects due to fluctuation in the extruding or injecting pressure.

The surface resistance of said aggregate is made extremely low as compared with the ordinary pure wood chips as it has been impregnated or adhered with thermosetting resin around its periphery. This enables the aggregate to be mixed and molded with the resin material at an extruding or injecting pressure almost the same as that of ordinary resin. On the other hand, in the conventional method, wood chips would adhere to the inner periphery of the cylinder, die or the like to induce friction resistance, rendering extrusion or injection impossible. If extrusion or injection is forced, the inner periphery of the cylinder, die and the like will be damaged, or wear or breakage thereof would occur.

Use of such aggregate improves the affinity of resinous material to be mixed, assures uniform mixing of the aggregate in the resultant molded substance and, thereby enables production of a mold of the desired quality level.

It is also anticipated that sanding powder which is formed in the sanding of the surface of the particle board and the like which is manufactured by an identical method can also be directly utilized.

The powder of calcium carbonate is used to prevent deformation of the molded product during extrusion or other processing. Also, as calcium carbonate itself is inexpensive, it is used in order to lower the unit cost of the molded product.

A stabilizer such as lead is also utilized together with these various materials to prevent deterioration of the molded product and minimize friction resistance which may occur during processing such as extrusion and the like.

If it is desired to color the molded product, any suitable colorant can be used; for example, titanium oxide can be used to obtain a white color.

The materials mentioned above can be used in the form of pellets premixed with resinous material such as vinyl chloride. They can also be mixed with vinyl chloride resin in the form of powder. The form of mixture can be selected depending on the kind or type of the molding machine, etc.

In preparing pellets, the aggregate in an amount less than 50 wt% of the powdered resin is mixed, to which calcium carbonate within the range of less than 10 wt% is added, if necessary, before adding and mixing any necessary stabilizer, smoothing agent and colorant. The mixture is then kneaded and heated to be molded into pellets. Using thus prepared pellets, synthetic molded product will be obtained using any conventional method for preparing resinous molds.

As an alternative method for preparing a molded product according to the present invention, a molding machine for directly molding the product in substantially the same manner as in the pellet formation can be used, to which all the necessary ingredients can be introduced for kneading, heating and molding.

Because said aggregate has to be mixed, extrusion or injection is generally employed as the method for molding the product with the extrusion and foaming for molding as an alternative.

The amount of the aggregate to be mixed is determined on the basis of the expected properties of the final product as well as the method of molding. Generally, it is in the range of between 20 and 50 wt%.

The processing temperature is also generally determined within the range of between 110° and 170° C. depending on the resinous material used, the amount of aggregate, molding method, etc.

The above methods enable production of the mold with various expected properties desirable in both wood and plastic.

The present invention method is particularly advantageous in that it can easily provide the final molds of various types which have otherwise been impossible in the prior art because of formation of wood vinegar gas or because the slip resistance of the wood chips was especially great.

Further, use of the aggregate according to the present invention makes it possible to improve its affinity with the resinous material to thereby assure excellent and uniform quality according to conventional molding methods and at the standard molding efficiency.

Because of the properties of said aggregate, there will be no excessive frictional resistance on the molding machine itself and damage to the cylinder or die at the inner wall can be prevented. This reduces the wear of the equipment greatly.

The final molded product thus obtained is, as has been described above, superior in its appearance of wood-finish, its resistance against water, wear and impact and has a very hard surface. Deformation of the mold due to shrinkage at the time of molding and deformation, warping or cracking after molding can also be prevented and the elasticity coefficient is also greatly improved.

The mold product according to the present invention also has a lower thermal deformation coefficient and is also superior in such workability qualities as grinding, coating, adhesion, nailing and the like.

Instead of pulverizing the wood material into cellulose fibres, it can be used in the form of very fine short fibres, or fine powder, and this means both needle-leaved and broad-leaved trees can be used in the present invention.

It is noted that in heating and hardening said urea resin directly mixed with wood chips, the undiluted urea resin is to be sprayed on the wood chips (of sufficiently fine particles) while simultaneously drying and hardening to neutralize the wood vinegar content. Normally, the wood chips are added in the form of a suspension in the sprayed mist of undiluted resin by means of hot air while thermosetting the mixture simultaneously.

The molding method for the synthetic wood-like mold product according to the present invention comprises the above steps. The final mold product thus obtained has a wide range of applications such as building materials for a door frame, window frame, horizontal wall member, edging member, skirting board, angle, railing, flooring, wall, sill, door stop, etc; materials for fittings such as frames for a paper sliding door, a door, a louver, etc.; and other uses in furniture, automobiles, ships and boats, electric appliances, various cabinets, etc.

What is claimed is:

1. A method of manufacturing a shaped, synthetic wood-like product comprising sequentially:
   preparing an aggregate by mixing dry wood meal with a thermosetting urea resin, heating the mixture at a temperature of about 100°–170° C. until the resin is set, to form aggregate having a particle size of 100 mesh or more;
   reducing the water content of said aggregate to less than 5%, and maintaining said reduced water content during manufacturing;
   reducing possibility of formation, dissociation or volatilization of wood vinegar or acid gases by said reduced water content and neutralization of said aggregate with urea resin;
   mixing said aggregate with a thermoplastic resin binder; and
   heat molding said aggregate/binder mixture into a desired shape.

2. The method of claim 1 wherein said aggregate water content is reduced to about 3–5%.

3. The method of claim 1 wherein said aggregate water content is reduced to as close to 0% as possible.

4. The method of claim 1 wherein said aggregate is subjected to heating and drying during its formation.

5. The method of claim 1 wherein said wood meal is subjected to heating and drying before mixing with the urea resin.

6. The method of claim 5 wherein said aggregate is subjected to heating and drying during its formation.

7. The method of claim 1 wherein said thermoplastic resin binder is a polyvinylchloride.

8. The method of claim 1 wherein said thermoplastic resin binder is an ABS resin or a polystyrene.

9. The method of claim 1 wherein said aggregate particle size is 150 mesh or more.

10. The method of claim 1 wherein said aggregate is prepared by mixing coarse wood meal with said urea resin, and subjecting the mixture to hot pressing into particles of 120 mesh or more.

11. The method of claim 10 wherein, after setting, said aggregate is reformed into particles of the desired size by grinding with the use of sandpaper.

12. The method of claim 1 wherein said aggregate is prepared by pulverizing said wood meal to a fine powder of 100 mesh or more, mixing said fine powder with the urea resin, and thermally setting the mixture by hot air into particles of 100 mesh or more.

* * * * *